United States Patent Office 3,448,999
Patented June 10, 1969

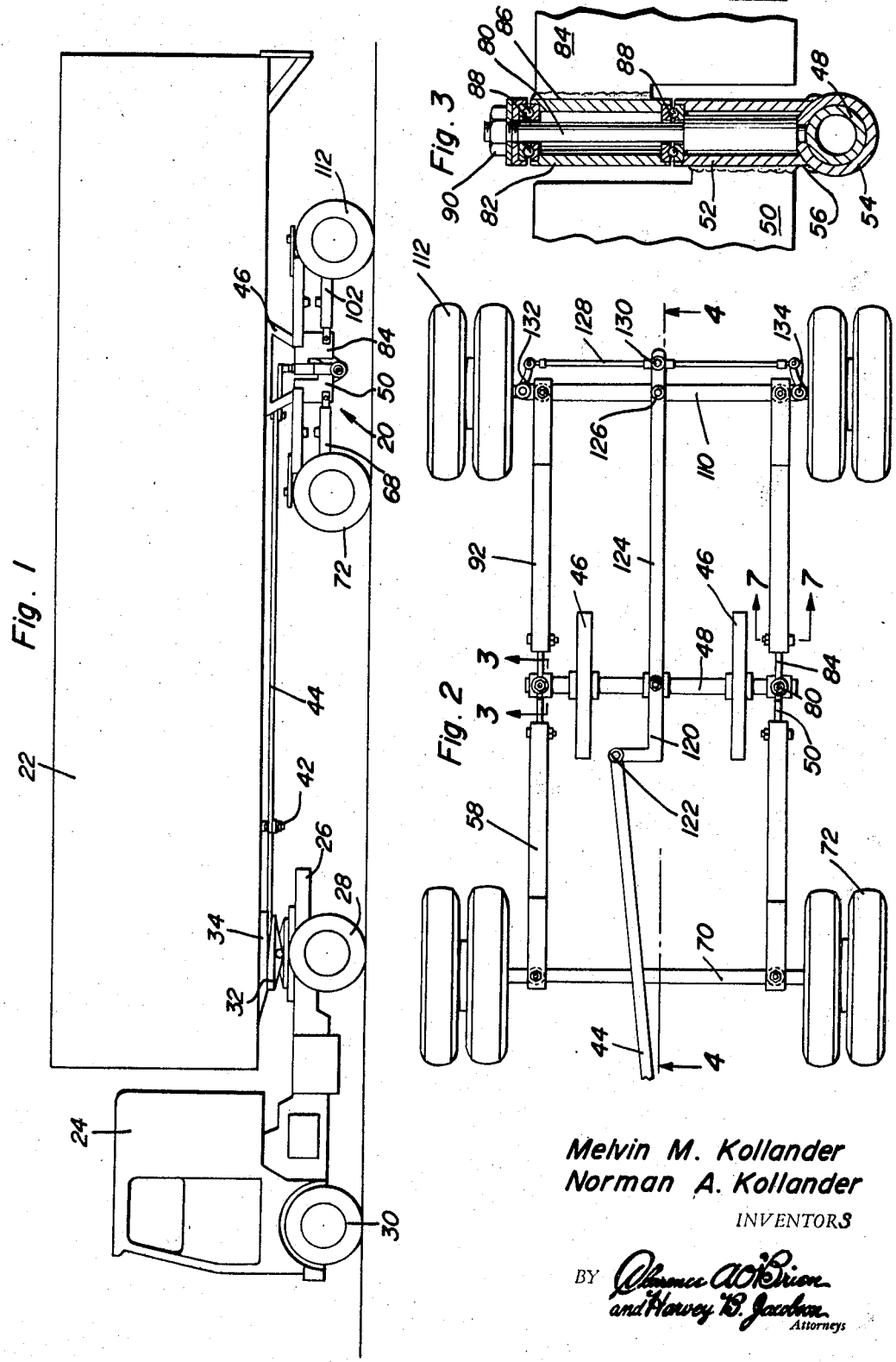

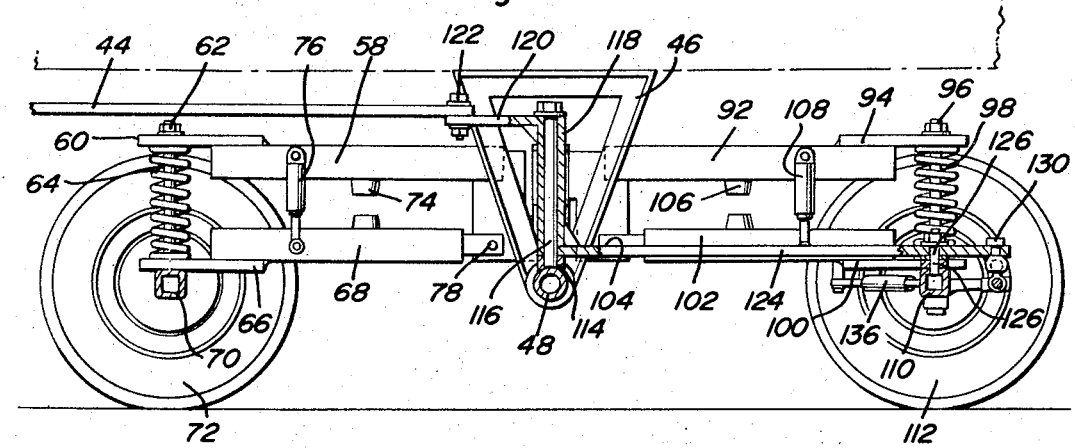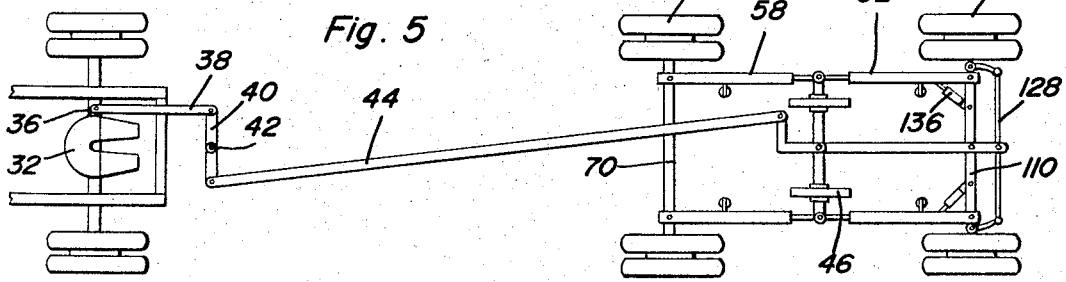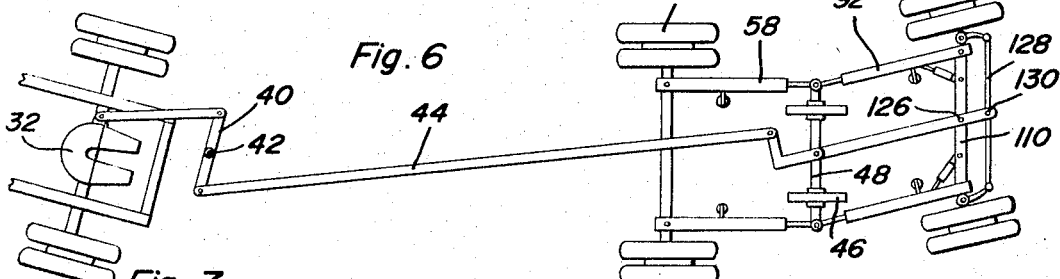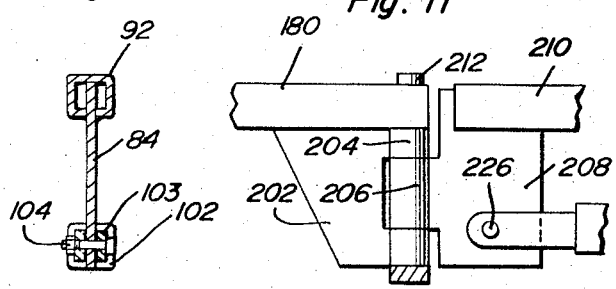

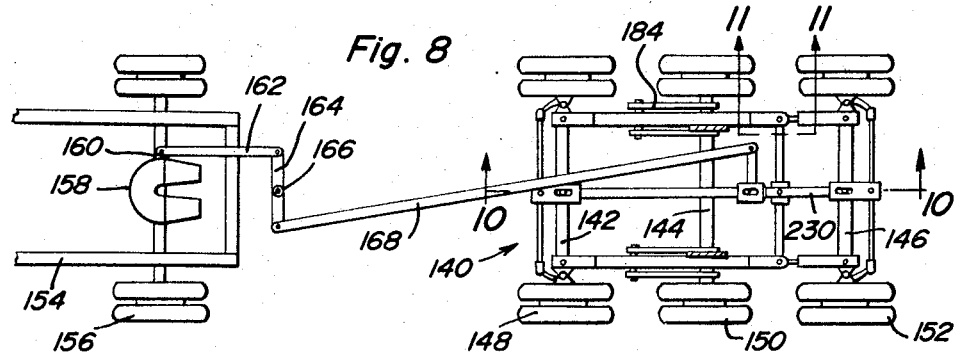
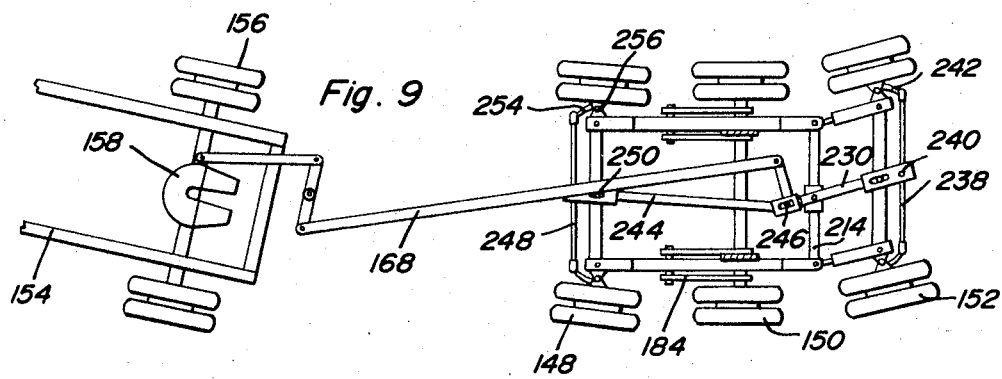
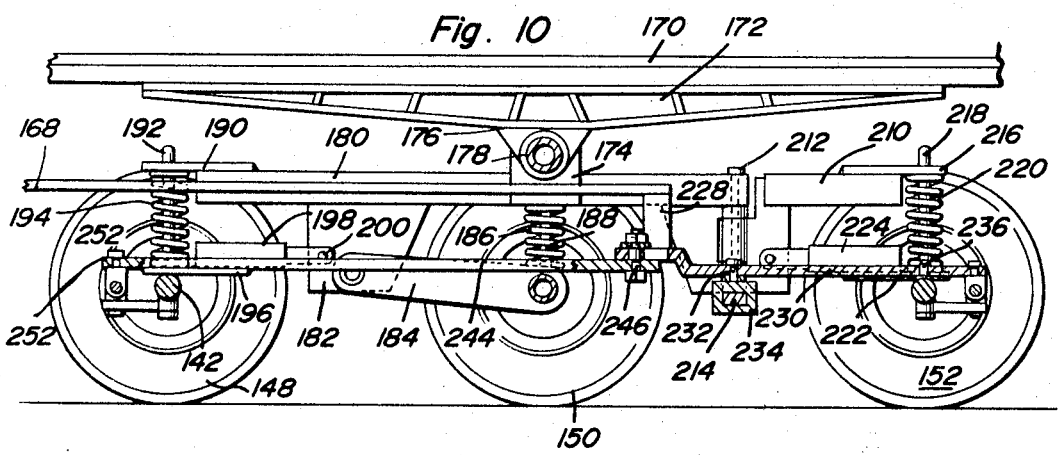
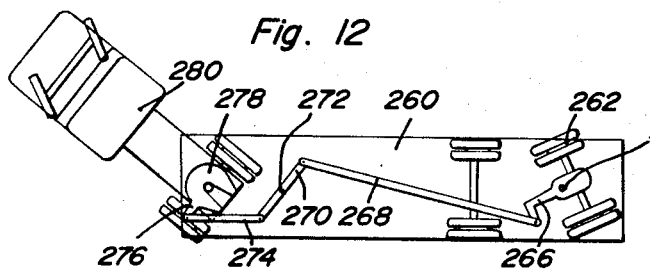
Melvin M. Kollander
Norman A. Kollander
INVENTORS

3,448,999
TRAILER SUSPENSION WITH STEERABLE AXLE
Melvin M. Kollander, P.O. Box 135, Cedar Crest, N.
 Mex. 87008, and Norman A. Kollander, 1122 N.
 Broadway St., Stillwater, Minn. 55082
Filed Dec. 22, 1966, Ser. No. 604,044
Int. Cl. B62d 53/06
U.S. Cl. 280—426                            7 Claims

ABSTRACT OF THE DISCLOSURE

A control for the full castering axle or wheels on a trailer-type vehicle for controlling the position of the castering axle or wheels when the vehicle is backing or moving rearwardly. The control includes an articulate mounting for the axle or wheels to enable full castering when the vehicle is moving forwardly and a linkage assembly connected with the towing vehicle in offset relation to the pivotal connection with the trailer-type vehicle for controlling the castering movement when backing up.

---

The present invention generally relates to a trailer suspension control assembly employed in combination with that type of trailer having multiple supporting axles with one or more of such axles or wheels thereon being castering with the control for the castering movement originating from the fifth wheel of the towing vehicle so that as the towing vehicle and trailer vehicle are backing up the castering axle or axles will be properly controlled from the towing vehicle.

An object of the present invention is to provide a trailer suspension having at least one pair of steerable wheels together with a control extending from the fifth wheel of the towing vehicle to operative association with the steerable wheels for controlling the position of the wheels.

A further object of the present invention is to provide a trailer suspension assembly in accordance with the preceding object in which a tandem axle suspension assembly is provided with the tandem axles being interconnected by articulate means with the rearmost of the tandem axles being shiftable laterally for steering control with the wheels on the rearmost tandem axle also being controlled for tracking of the supporting wheels in an optimum condition when negotiating a curve thereby enabling side skidding and scuffing of the wheels to be eliminated when traveling in a forward direction and also when traveling in a rearward direction and enabling the spatial relationship between the tandem axles to be elongated as desired so as to utilize maximum load limits permitted in some states where limits are determined by formulas guided by distances between axles as well as the number of axles.

Still another object of the present invention is to provide a trailer suspension in accordance with the initial object of the invention in which three tandemly arranged axles are provided with the rearmost and forwardmost axle assemblies being capable of castering and having steering control association with the fifth wheel of the towing vehicle for properly positioning the castering axle assemblies when backing the trailer.

Yet another object of the present invention is to provide a trailer suspension having multiple axles with the rearmost axle being a castering axle with the castering movement thereof being controlled from the fifth wheel of the towing vehicle.

It is another important object of the present invention to provide a suspension assembly for load carrying semi-trailer vehicles which is relatively simple and rugged in construction, dependable, effective for controlling steering movement of the steerable axle and wheel assemblies and yet be relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a semi-trailer and towing vehicle employing the suspension assembly of the present invention;

FIGURE 2 is a plan view of the suspension assembly illustrating the association of the components;

FIGURE 3 is a detail sectional view taken substantially upon a plane passing along section line 3—3 of FIGURE 2 illustrating the specific construction of the articulate connection between the front and rear axle assemblies;

FIGURE 4 is a longitudinal, vertical sectional view taken substantially upon a plane passing along section line 4—4 of FIGURE 2 illustrating further structural details of the invention;

FIGURE 5 is a schematic plan view illustrating the association of the suspension assembly with the fifth wheel of a towing vehicle;

FIGURE 6 is a schematic plan view similar to the arrangement of FIGURE 5 but illustrating the towing vehicle and the rear axle assembly and rear wheels pivoted to an angulated orientation in relation to the front wheels of the suspension assembly;

FIGURE 7 is a detail sectional view taken substantially upon a plane passing along section line 7—7 of FIGURE 2 illustrating further structural details of the invention;

FIGURE 8 is a schematic plan view illustrating another embodiment of the invention employing three tandemly arranged axle and wheel assemblies;

FIGURE 9 is a plan schematic view similar to FIGURE 8 but with the front and rear axle assemblies and wheels thereon orientated in their angular position;

FIGURE 10 is a longitudinal, sectional view taken substantially upon a plane passing along section line 10—10 of FIGURE 8 illustrating the structural details of this embodiment of the invention;

FIGURE 11 is a detailed elevational view taken substantially upon a plane taken along reference line 11—11 of FIGURE 8 illustrating the articulate connection employed in this form of the invention; and FIGURE 12 is a schematic plan view illustrating an embodiment of the invention incorporated with another type of rear castering axle assembly.

Referring now specifically to the drawings, the trailer suspension assembly of the present invention is generally designated by the numeral 20 and is illustrated in association with a conventional semi-trailer 22 and a conventional towing vehicle or tractor 24 having the usual chassis 26, driving wheels 28, front steerable wheels 30 and a fifth wheel 32 all of which represent conventional structure insofar as the towing vehicle is concerned. The semi-trailer is provided with the usual plate and kingpin assembly 34 for association with the fifth wheel 32 in a conventional manner for articulately connecting the semi-trailer 22 to the towing vehicle 24 to enable relative pivotal movement about a vertical axis defined by the kingpin and also about a horizontal axis defined by the conventional structure of the fifth wheel assembly 32.

As illustrated in FIGURES 5 and 6, the fifth wheel 32 is provided with a laterally extending lug 36 disposed in the transverse horizontal plane of the kingpin and an elongated link 38 is pivotally attached to the lug 36. The link 38 is attached at its end to a transversely extending fulcrum lever 40 that is pivotally supported from the semi-trailer 22 by a pivotal support 42 in the center thereof so that as the link 38 moves with the fifth wheel 32 in relation to the semi-trailer, the lever 40 will be fulcrumed about the central fulcrum point 42. The end of the lever 40 remote from its point of connection with the link 38 is pivotally attached to an elongated operating link 44 which extends rearwardly in underlying relation to the semi-trailer 22 for connection with the suspension assembly 20 in a manner described hereinafter.

The suspension assembly 20 includes a pair of laterally spaced depending generally triangular brackets 46 that are secured to the semi-trailer structure 22 in any suitable manner. At the lower apex of the triangular brackets 46, a rigidly and transversely extending tubular support member 48 is provided. At each outer end of the support 48, there is provided a vertically disposed supporting plate 50 that has a sleeve 52 rigidly connected to the edge thereof with the sleeve being substantially one-half of the height of the plate 50. The sleeve 52 is rigidly affixed to a sleeve 54 as by welding 56 or the like to provide a rigid support for a forwardly extending support arm 58. The forwardly extending support arm 58 is provided with a bracket plate 60 at the outer end thereof which receives one end of a retaining bolt 62 having a coil compression spring 64 encircling the same with the other end of the spring 64 engaging a plate 66 on a pivotal support arm 68. The bottom end of the retaining bolt 62 is rigidly affixed to a transversely extending axle 70 having supporting wheel assemblies 72 rotatable on the ends thereof in a conventional manner. Thus, variations in the load will be supported by the spring 64 with the pivotal movement of the arm 68 in relation to the arm 58 being limited by limit stop members 74 and controlled by the bolt 62 and conventional shock absorber 76 extending between the arms 58 and 68. The rearward end of the supporting arm 68 is pivotally attached to the supporting plate 50 as at 78 so that a forward trailing arm type of support is provided for the forward axle 70.

Also attached to the sleeve 54 is an upstanding rigid bolt 80 received in the sleeve 52 and forming a kingpin for rotational movement of a sleeve 82 thereon. The sleeve 82 has a vertical rear supporting plate 84 rigidly fixed thereto as by welding 86 or the like. Bearing assemblies 88 are provided between the sleeve 82, the kingpin 80 and between the sleeve 82 and the sleeve 52 and a retaining cap assembly 90 so that the rear mounting plate 84 may pivot about a vertical axis defined by the bolt 80 with the sleeves 82 and 52 being relatively rotatable in relation to each other but prevented from any tilting relative movement by the kingpin or bolt 80 and the associated bearing assemblies.

Extending rearwardly from the upper end of the plate 84 is a trailing support arm 92 having a support plate 94 projecting from the rear end thereof and receiving a retaining bolt 96 and engaging the upper end of a coil spring 98. The lower end of the coil spring 98 rests against a rearwardly extending plate 100 carried by the rear end of trailing support arm 102 which is pivotally attached to the bottom of the plate 84 by a pivot connection 104. Limit stops 106 are provided for limiting movement of the arm 102 and a conventional shock absorber 108 is provided between the arms 92 and 102. Thus, a rear axle 110 having supporting wheel assemblies 112 thereon is supported from the lower end of the retaining bolt 96 for supporting the semi-trailer in a known manner so that as irregularities and additional loads are encountered, such irregularities or changes in loads will be compensated for by the springs 64 and 98 in a conventional manner.

Centrally of the support member 48, there is provided a sleeve or collar 114 and a rigidly extending upstanding bolt 116 having an elongated sleeve 118 journaled thereon and retained in place by the bolt 116 which may be threaded into the socketed sleeve 114 or secured thereto in any suitable manner. The upper end of the sleeve 118 is provided with a forwardly and laterally extending arm 120 which is pivotally attached to the rear end of the elongated connecting link by a pivot bolt 122. The lower end of the sleeve 118 is provided with a rigid arm or link 124 which extends rearwardly and in overlying relation to the axle 110. The arm 124 is pivotally connected to the axle 110 by an upstanding pivot pin 126 and the rearward end of the arm 124 is pivotally connected to a transversely extending drag link 128 by a pivot pin 130. Each of the drag link 128 is connected to a steering arm 132 which extends laterally from a wheel assembly 112 which is steerable about a kingpin 134 thus enabling the wheel assemblies 112 to be pivoted about the vertical axes of the kingpins 134 while being maintained in parallel relation to each other and enabling the axle 110 to swing laterally about the vertical axes defined by the bolts 80 at each end of the support member 48.

Cushioning shock absorber members 136 are provided between the axle 110 and the support arms 102 and connected thereto in a conventional manner to cushion the movement of the arms 102 in relation to the axle 110.

FIGURE 5 illustrates the orientation of components when both the towing vehicle and the semi-trailer are moving in a straight line path. As the towing vehicle proceeds forwardly around a curve the forward axle 70 pivots and causes the rear section to caster and follow the path of the forward axle. Linkages 40, 44 and 124 are constructed so as to follow the castering effect without exerting forces to oversteer or understeer. As the towing vehicle moves rearwardly the forces exterted by the connection with the fifth wheel 32 are such that the rear axle 110 will be controlled in its movement about the bolts or kingpins 80 and at the same time the wheel assemblies 112 will be controlled about the kingpins 134 so that the drive wheel assemblies 28, the front wheel assemblies 72 and the rear wheel assemblies 112 will track more accurately in an arcuate or curved path with the degree of movement being controlled by the movement imparted to the fifth wheel and the associated linkage. The orientation and length relationship of the links may vary depending on the distance necessary to move the link.

While the support member 48 has been orientated generally equally spaced from the front and rear axle assemblies, it is pointed out that this orientation may vary with good results being obtained with the support member 48 disposed approximately at any point as long as it is spaced outwardly of the circumference of the tires. The pivot point will be disposed as far to the rear as possible to maintain a high degree of stability in that the rear axle and wheels will be kept more under the trailer.

FIGURE 7 illustrates the construction of the support plate 84 and the upper support arm 92 which is a hollow box member and rigidly fixed to the plate 84 in any suitable manner such as by welding or the like. Any suitable type of steel castings, means or the like may be employed. This figure also illustrates the pivotal connection between the lower hollow box arm 102 which may have lugs 103 extending forwardly therefrom with the pivot bolt 104 extending therethrough and through the lower edge portion of the vertical plate 84.

FIGURES 8–11 illustrate a similar construction except that three axles are employed in the trailer suspension assembly which is generally designated by numeral 140. In this construction three axles 142, 144 and 146 are provided with wheel assemblies 148, 150 and 152 being provided thereon with the front and rear wheel assemblies 148 and 152 being pivotal or steerable whereas the central wheel assemblies 150 are fixed in relation to the axle 144.

The towing vehicle is designated by numeral 154 and includes rear driving wheels 156, fifth wheel assembly 158, laterally extending lug 160, rearwardly extending link 162, transversely extending fulcrum lever 164 supported by a central pivot bolt 166 and a rearwardly extending connecting rod or link 168 pivoted to the opposite end of the lever 164 from the link 162 which represents substantially the same arrangement as that disclosed in FIGURES 1–7.

In this construction, the semi-trailer is designated by numeral 170 and includes a supporting chassis assembly or bracket 172 thereon having depending supporting brackets 174 pivoted to depending lugs 176 by a transverse tubular member 178.

The brackets 174 are rigidly fixed to an elongated supporting arm 180 which has depending supporting plates 182 intermediate the ends thereof. The depending supporting plates 182 pivotally support rearwardly extending support arms 184 which have the rear ends thereof connected to the transversely extending axle 144. Coil springs 186 extend between the axle 144 and the arm 180 for spring supporting the axle 144 with the coil spring 186 being retained on a guide bolt 188 or the like. The forward end of each arm 180 is provided with a supporting plate 190 receiving a retaining bolt or rod 192 and engaging the upper end of a support coil spring 194 which has the lower end thereof engaging a support plate 196 carried by a rearwardly extending arm 198 pivoted to the depending plate 182 by a pivot pin 200 for enabling vertical movement of the forward axle 142 as guided by the pin or bolt 192 which is secured at its lower end to the axle 142.

The rear end of each of the arms 180 is provided with a depending plate 202 as illustrated in FIGURE 11 and the plate 202 has a pair of sleeves 204 formed in spaced relation on its rear edge for receiving therebetween a sleeve 206 on the forward edge of a vertical plate 208 having an upper support arm 210 rigid therewith. The sleeves 204 and 206 are retained in assembled relation by a vertically extending bolt or pin 212 extending therethrough with the lower end thereof being connected with a transversely extending bar 214.

The rear end of support arm 210 is provided with a plate 216 receiving a guide pin or bolt 218 and engaging the upper end of a coil spring 220 which has the lower end thereof engaging the rearwardly extending plate 222 on the forwardly extending arm 224 which is pivoted to the lower edge of the plate 208 by a pivot pin 226 so that the rear axle 146 may swing vertically as determined by the spring 220 and the guide pin 218 which is fixed at its lower end to the rearmost axle 146. This structure enables lateral swinging movement of the rear axle 146 in relation to the central axle 144 and the front axle 142 as illustrated when comparing FIGURES 8 and 9.

For swinging the axle 146 and also controlling pivotal movement of the wheel assemblies 152 and 148, the rearwardly extending link 168 is pivotally connected to an offset arm 228 which extends upwardly from one end of a fulcrum lever 230 that is pivotally attached to a pin 232 carried by a bracket 234 on the transverse bar 214. The rear end of the lever 230 extends over and beyond the rear axle 146 and is pivotally connected thereto as by a pivot pin 236 so that the leverage obtained by the rear castering axle 146 will steer the forward axle or wheels thereon. The pivot pin 236 may be received in a slot in the arm 230 if desired and the rear end of the lever 230 is pivotally connected to a drag link 238 by a pivotal connection 240. The ends of the drag link 238 are attached to steering arms 242 on the wheel assemblies 152 for pivotal movement thereof while maintaining parallelism thereof.

Extending forwardly from the lever 230 is a forward lever 244 which is pivotally attached to the forward end of the rear lever 230 by a pivotal connection 246. The forward end of the forward lever 244 is pivotally connected to the forward axle 142 and extends beyond the forward axle and is connected to a drag link 248. The pivotal connection with the forward axle 142 is designated at 250 and the pivotal connection with the drag link 248 is designated at 252. The ends of the drag link 248 are connected to steering arms 254 to enable the forward wheel assemblies 148 to pivot about kingpins 256 of a conventional construction which, of course, are also provided for the rear steerable wheels 152.

In this construction, all of the axles are spring supported with the rearmost axle being laterally swingable and the rearmost wheels being steerable and the forwardmost wheels 148 also being steerable but with the forwardmost axle 142 being laterally stable thereby providing an arrangement in which three tandem axles are orientated with the forwardmost wheel assemblies being pivoted in relation to the axle and the rearmost wheel assemblies being pivoted in relation to the axle and the rearmost axle laterally movable in relation to the central and forwardmost axles for enabling the movement of the towing vehicle in a curved path to control movement of the steerably controlled elements of the trailer suspension assembly when backing up.

FIGURE 12 illustrates a construction in which a semi-trailer 260 has a rearmost castering axle assembly 262 for pivotal movement about a vertical axis 264 forwardly of the rearmost axle so that the rearmost axle 262 would normally be freely castering within limits. However, by providing an offset arm 266 in relation to the pivot axis 264, the elongated connecting link 268 which extends rearwardly from the fulcrum lever 270 that is pivotally supported at its mid-point at 272 will control the pivotal movement of the castering axle 262 by virtue of a forwardly extending link 274 being connected to an offset arm 276 on the fifth wheel assembly 278 carried by the towing vehicle 280 thus providing for pivotal movement of the rearmost axle about a vertical pivot axis without any pivotal movement of the wheel assemblies in relation to the rearmost axle.

While the structural details sufficient for operation of the invention have been illustrated, it is pointed out that conventional structural components such as ball joints, rubber mounted bushings and the like may be appropriately incorporated into the structural in accordance with present day conventional construction procedures. This is also true of lubrication facilities, the details of the shock absorbers, spring mounting assemblies and the like as well as the specific details of the kingpin assemblies and wheel assemblies at each end of the axles. The particular dimensional relationships and characteristics will vary for various installations and where necessary, pin and slot connections are employed for enabling swinging movement. Also, if desired, a resilient coupling may be incorporated into the control linkage to enable a tractor or towing vehicle to the assembled with the semi-trailer which may be sitting still without the towing vehicle being aligned exactly in alignment with the semi-trailer although this is the usual procedure. Any suitable convenient connection may be provided for connecting the operating linkage to the fifth wheel assembly and if desired, an automatic latch and release mechanism may be provided for enabling the operator of the towing vehicle to readily disconnect the towing vehicle from the semi-trailer or readily connect the towing vehicle to the semi-trailer with the operating linkage being automatically or manually connected or released.

The steering control assembly may be oriented either on the right-hand side or on the left-hand side of the trailer suspension assembly by merely operatively orientating the position of the connecting links in relation to the fulcrum lever. Also, the steering control assembly may be employed with a tandem axle arrangement in which the rearmost axle is stationary but provided with steerable wheels at the ends thereof with the arrangement being equally adapted to two or three axle tandem assemblies with the rearmost axle being stationary with steerable wheels on the ends thereof, castering without steerable wheels or both laterally movable and provided with steerable wheels. In three axle assemblies, the wheels on the forwardmost axle may be steerable with the axle itself laterally stable.

The control linkage employed in this invention is primarily operative effectively in a reverse direction of movement and effectively controls the position of the castering axles while backing while adding stability when going forward and enables relatively large distances to be provided between the axles thereby more effectively distributing the payload for enabling a larger payload to be carried over the road without violation of various regulations computed on the basis of maximum load per axle and distance between axles. The use of the equal size coil springs and the orientation of the support arms enables the load supported on the trailer to be more easily determined by visual inspection of the position of the support arms thus reducing the necessity of continuously pulling onto a scale to keep within the load limits. The elimination of the side scuffing and reduction in wear derived from the castering arrangement, of course, has many economic advantages such as longer tire life, less wear and tear on the semi-trailer, less fuel costs, equalized loading and better traction and control qualities throughout the operating range of the vehicle and the control arrangement of the present invention enables the castering arrangement to be effectively backed.

The foregoing is considered as illustrative only of the principles of the invention. Further, since numerous modifications and changes will readily occur to those skilled in the art, it is not desired to limit the invention to the exact construction and operation shown and described.

What is claimed as new is as follows:

1. In a semi-trailer type vehicle pivotally connected with a towing vehicle for articulate movement about substantially a vertical axis adjacent the forward end of the semi-trailer, a suspension assembly for the semi-trailer type vehicle comprising at least a pair of tandemly arranged axles with each axle having a wheel assembly on each end thereof, means swingably supporting the rearmost of said axle and wheel assemblies from the semi-trailer type vehicle while retaining the axles substantially parallel and means operatively connecting the rearmost of the axle and wheel assemblies to the towing vehicle in offset relation to the vertical axis for controlling the castering movement of the rearmost of the axle and wheel assemblies during backing movement of the vehicles.

2. In a semi-trailer type vehicle pivotally connected with a towing vehicle for articulate movement about substantially a vertical axis adjacent the forward end of the semi-trailer, a suspension assembly for the semi-trailer type vehicle comprising at least a pair of tandemly arranged axles with each axle having a wheel assembly on each end thereof, the rearmost of said axle and wheel assemblies being pivotally supported for castering movement, and means operatively connecting the rearmost of the axle and wheel assemblies to the towing vehicle in offset relation to the vertical axis for controlling the castering movement of the rearmost of the axle and wheel assemblies during backing movement of the vehicles, said rearmost axle and wheel assembly including a rigid axle and steerable wheels at the outer ends thereof, said means operatively connected to the towing vehicle controlling the pivotal movement of the steerable wheels at the outer ends of the axle.

3. The structure as defined in claim 2 wherein the rearmost axle is pivotally supported for laterally swinging in relation to the semi-trailer vehicle, said means operatively connected to the towing vehicle controlling the lateral swinging of the rearmost axle as well as the steerable movement of the rearmost wheel assemblies.

4. In a semi-trailer type vehicle pivotally connected with a towing vehicle for articulate movement about substantially a vertical axis adjacent the forward end of the semi-trailer, a suspension assembly for the semi-trailer type vehicle comprising at least a pair of tandemly arranged axles with each axle having a wheel assembly on each end thereof, the rearmost of said axle and wheel assemblies being pivotally supported for castering movement, and means operatively connecting the rearmost of the axle and wheel assemblies to the towing vehicle in offset relation to the vertical axis for controlling the castering movement of the rearmost of the axle and wheel assemblies during backing movement of the vehicles, said means operatively connected with the towing vehicle including a fulcrum lever carried by the semi-trailer vehicle and extending transversely thereof and being pivotally supported adjacent its center, one end of the lever connected to the towing vehicle by a connecting link, the other end of the lever being connected to an elongated operating link extending rearwardly under the trailer to the suspension assembly, and a steering arm pivotally connected to the operating link for controlling movement of the rearmost axle and wheel assembly.

5. In a semi-trailer type load carrying vehicle articulately connected to a towing vehicle through a vertical pivotal connection, a suspension assembly comprising at least one axle and wheel assembly pivotally supported from the semi-trailer type vehicle for steering control, and means operatively interconnecting the axle and wheel assembly with the towing vehicle to control the steerable condition of the axle and wheel assembly in response to variations in the angular relationship between the towing vehicle and the semi-trailer vehicle about the vertical pivotal connection, said suspension assembly also including at least one stationary axle and wheel assembly, said means operatively interconnecting the towing vehicle and the axle and wheel assembly orienting the wheels on the steerable axle and wheel assembly in angular relation to the wheels on the stationary axle and wheel assembly for tracking in a curved path, the pivotally supported axle and wheel assembly being disposed rearwardly of the stationary axle and wheel assembly with the pivotally supported axle and wheel assembly being laterally movable in relation to the longitudinal axis of the semi-trailer, said means operatively interconnecting the pivotally supported axle and wheel assembly with the towing vehicle controlling the lateral movement of the rearmost axle and wheel assembly.

6. The structure as defined in claim 5 wherein the pivotally supported axle and wheel assembly includes a pivotal wheel unit on each end of the axle for pivotal movement about a substantially vertical axis at each end of the axle, said means interconnecting the pivotally supported axle and wheel assembly with the towing vehicle controlling the pivotal movement of the wheel units on the ends of the pivotally supported axle and wheel assembly for accurate tracking and backing operations of the connected vehicles.

7. The structure as defined in claim 6 wherein said suspension assembly includes a second stationary axle and wheel assembly oriented forwardly of the first mentioned stationary axle and wheel assembly, said second stationary axle and wheel assembly including a steerable wheel at each end thereof pivotally supported for movement about substantialy vertical axes, said means operatively interconnecting the pivotally supported axle and wheel assembly with a towing vehicle also controlling the steerable condition of the steerable wheel at the ends of the second stationary axle and wheel assembly.

References Cited

UNITED STATES PATENTS

| | | |
|---|---|---|
| 2,333,853 | 11/1943 | Fellabaum. |
| 2,433,268 | 12/1947 | Fellabaum. |
| 2,433,269 | 12/1947 | Fellabaum _____ 280—426 |
| 2,785,909 | 3/1957 | Barnard _____ 280—426 |
| 2,954,239 | 9/1960 | Kollander _____ 280—426 |
| 3,195,922 | 7/1965 | Humes _____ 280—426 |
| 3,291,503 | 12/1966 | De Lay _____ 280—426 X |

LEO FRIAGLIA, *Primary Examiner.*

U.S. Cl. X.R.

280—81